United States Patent [19]

Ainlay

[11] Patent Number: 4,474,054
[45] Date of Patent: Oct. 2, 1984

[54] LEAK DETECTOR FOR UNDERGROUND STORAGE TANKS

[76] Inventor: John A. Ainlay, 3330 Grant St., Evanston, Ill. 60201

[21] Appl. No.: 458,349

[22] Filed: Jan. 17, 1983

[51] Int. Cl.³ .............................................. G01M 3/30
[52] U.S. Cl. ....................................... 73/49.2; 73/302
[58] Field of Search ......................... 73/302, 49.2, 747

[56] References Cited

U.S. PATENT DOCUMENTS

| | | | |
|---|---|---|---|
| 1,100,867 | 6/1914 | Dexter | 73/302 |
| 1,352,038 | 9/1920 | Szekely | 73/747 |
| 1,687,506 | 10/1928 | Novick | 73/302 |
| 1,759,873 | 5/1930 | Shewmon | 73/302 |
| 1,819,655 | 8/1931 | Mohr | 73/302 |
| 1,822,458 | 9/1931 | Rowland et al. | 73/302 X |
| 2,012,511 | 8/1935 | Hubbard | 73/302 |
| 2,041,859 | 5/1936 | Pyle et al. | 73/302 |
| 3,473,387 | 10/1969 | Meriam | 73/747 |
| 3,834,236 | 9/1974 | Durin | 73/302 |

OTHER PUBLICATIONS

Kent-Moore Model 1000 "Tank System Tightness Tester".
Sun Refining and Marketing Company "Leak Lokator".
Horner Creative Metals, Inc. "Ezy-Chek".
Texaco Leak Detector.

*Primary Examiner*—Gerald Goldberg
*Assistant Examiner*—Joseph W. Roskos
*Attorney, Agent, or Firm*—McDougall, Hersh & Scott

[57] ABSTRACT

A leak detector includes an air tight chamber having three openings therein. The first opening is connected to a source of compressed air or other gas. The second opening is provided to the fill pipe of a tank to be tested for leaks. The third opening is connected to a slope tube which is calibrated to detect changes in the height of a column of liquid in a slope tube. When pressure is applied to the chamber from the source of compressed air, bubbles are forced into the fill pipe. A corresponding pressure creates and maintains a column of liquid in the slope tube. Changes in the level of the fluid in the tank due to leakage result in a corresponding change in the level of fluid in the slope tube.

9 Claims, 2 Drawing Figures

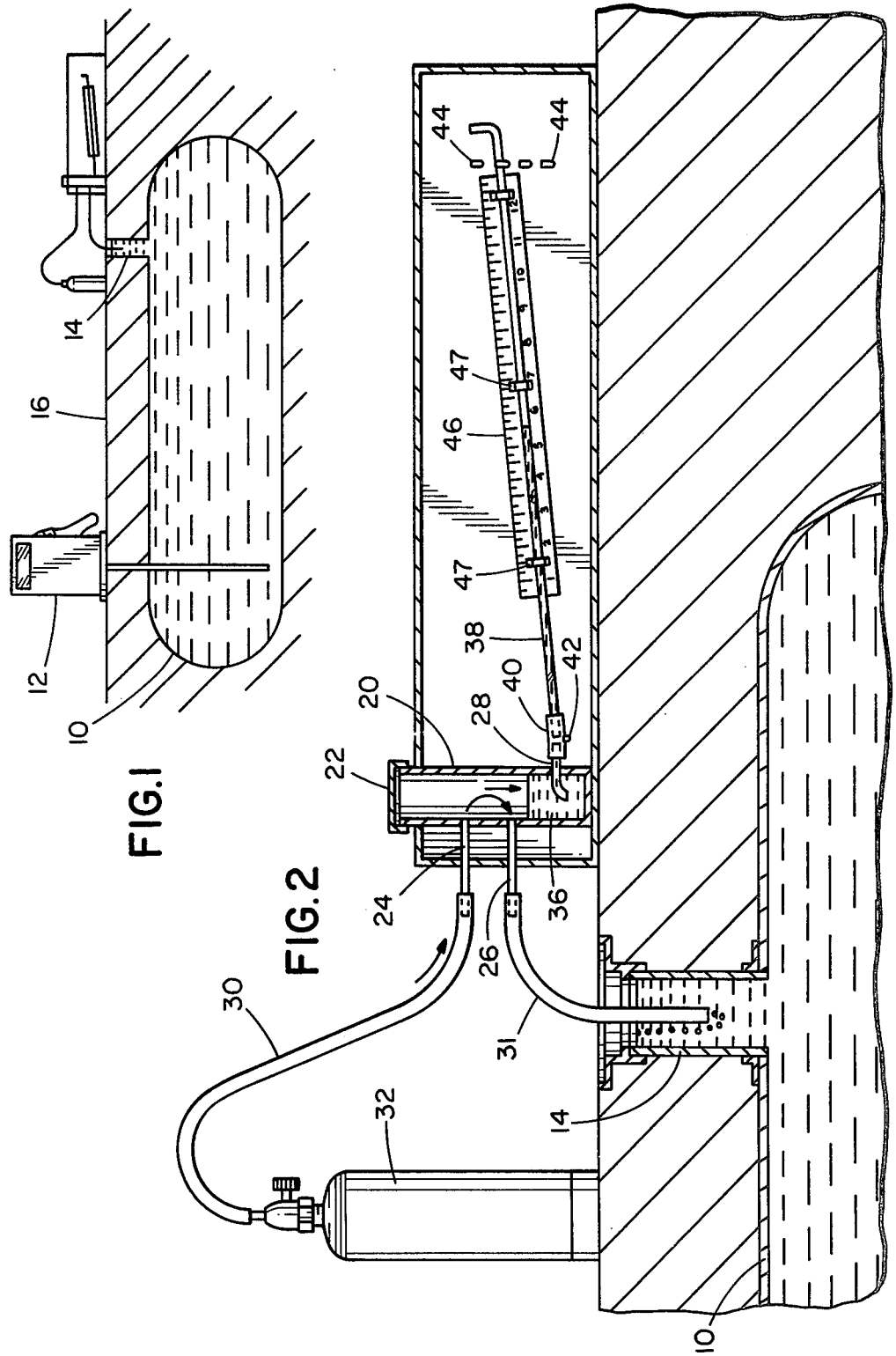

LEAK DETECTOR FOR UNDERGROUND STORAGE TANKS

BACKGROUND OF THE INVENTION

This invention relates to the field of analytical instruments. More specifically, it relates to the field of instruments for testing underground storage tanks or other inaccessible tanks for leaks. Recent government regulations have required the detection and correction of relatively minor leaks in underground storage tanks which contain various chemicals, such as gasoline, kerosine, diesel fuel and the like. This is in order to prevent the contamination of ground water or the soil. The regulations require the detection and correction of minute leaks on the order of 0.05 gallons per hour.

In the case of underground tanks, it is not possible, of course, to visually inspect the tanks for leaks and it is relatively expensive to repair the tanks in the event of a leak. Accordingly, there is a need to know whether or not such tank is leaking and, if so, the extent of the leak in order that an informed judgment may be made concerning the need to service the tank.

Tank testing systems for underground tanks are known in the art. Perhaps the most well known system is the Kent-Moore system which employs a circulating pump, a temperature recording instrument, a test stand pipe and a graduated cylinder. This system, while quite accurate, is relatively complex and bulky.

Other attemps at measuring leaks in underground tanks have been proposed and are detailed in the accompanying prior art statement. These devices, however, lack the simplicity, accuracy, portability and low cost of the present invention.

It is accordingly an object of the present invention to provide a tank-testing device which is portable, accurate and low in cost whereby underground storage tanks can be checked for leakage.

Another object of the invention is to provide a tank-testing device which is simple to operate and requires only easily obtained equipment, such as a compressed air cylinder, piping and tubing for operation.

A further object of the invention is to provide a testing device capable of magnifying changes in the level of a tank under test, whereby an accurate determination of small leaks can be made.

Other objects and advantages of the invention will be apparent from the remaining portion of the description.

BRIEF DESCRIPTION OF THE DRAWINGS

FIG. 1 is a schematic drawing showing a typical underground tank installation and the manner in which the invention is employed to test for leaks.

FIG. 2 is an enlargement of a portion of FIG. 1 showing the details of the invention.

DETAILED DESCRIPTION

Referring to the drawings, the invention is illustrated. A typical underground tank 10 is shown the purpose of which is to store gasoline, diesel fuel or the like. The liquid is dispensed by a pump mechanism 12 in a conventional manner. The underground tank 10 is periodically refilled via a fill pipe 14 which extends from the tank upwardly to the surface 16.

According to the invention, a light weight portable tank tester is disclosed which is simple in operation yet remarkably accurate. The tester is preferably enclosed in a case 18 for easy portability. Mounted within the case 18 is an air tight chamber 20 having a removable cap 22 for purposes of providing access to the chamber for cleaning or service. Three openings are provided in the chamber 20, each opening having associated therewith a pipe 24, 26, and 28, respectively.

Pipe 24 is connected via a flexible tube 30 to a source of compressed air or other gas, such as propane, as indicated by tank 32. Tank 32 can be a low pressure source of the type commercially available. Pressures on the order of 20 to 30 psi are adequate for the purposes of the invention.

Pipe 26 is connected to a bubble tube 31 of sufficient length to be inserted into the fill pipe 14 of the tank 10. Pipe 28 is disposed at the lower end of the air tight chamber 20 and in operation of the invention is maintained under water or other fluid as indicated at 36.

Pipe 28 is connected to a glass or plastic slope tube 38 by a flexible connector 40. The conencter 40 and the sections of the tube and pipe are supported at one end thereof by a hook 42. The opposite end of the slope tube is supported by one of a plurality of similar hooks 44. The particular hook 44 employed permits selection of the sensitivity of the apparatus as will be described. The slope tube 38 has, mounted along a substantial portion thereof, a graticule element 46 which may simply be a yard or meter stick approprately attached, as by clips 47, to the slope tube to permit easy observation of changes in the fluid level of the slope tube during operation of the invention. For example, in FIG. 2, fluid is indicated as reaching a level of 5 ½ on the graticule element 46.

As will be apparent to those skilled in the art, if the slope tube were moved to a lower one of the hooks 44, the fluid would reach a higher level on the graticule element as, for example, the 8 or 9 mark. The various hooks 44 permit the device to be easily and quickly adjusted both for maximum sensitivity and to ensure that the fluid is at an appropriate level for the test.

The operation of the invention will now be described. The apparatus is set up sufficiently close to the fill pipe of the tank that the bubble tube 31 may be inserted therein. The tank is filled until the liquid level extends to the top of the fill pipe 14. A liquid is placed into the chamber 20 until the pipe 28 is submerged therein whereby pressure from the tank 32 will cause the liquid to be displaced into the slope tube 38.

To initiate the test, the source of pressurized air or other gas is activated to pressurize the chamber 20 above atmospheric pressure. The compressed gas begins to bubble out of the bubble tube 31 as indicated in FIG. 2. Simultaneously liquid is forced from the air chamber 20 into the slope tube 38 to an intermediate position. It should be noted that the level of liquid in the slope tube is a function of the depth to which the bubble tube is inserted into the fill pipe as well as the particular hook 44 on which the slope tube is supported.

After a brief period of operation, the unit will stabilize with a constant pressure flowing through the chamber, a relatively constant amount of gas bubbling through the tube 31 and liquid being maintained at an essentially constant level in the slope tube 38. The slope tube level is then noted, as for example, in the illustrated embodiment, 5 ½ on the marker stick 46.

Leak testing is accomplished simply by monitoring the reading on the slope tube over a brief known interval, for example, ten to thirty minutes. If the tank is leaking, minute drops in the liquid level will lower the level in the relatively small diameter fill pipe 13 during the test interval. Any drop in the level of liquid in the fill pipe 14 will cause a change in the liquid level of the slope tube 38. This is because the pressure required to force bubbles out of the bubble tube 31 into the fill pipe liquid is directly proportional to the depth of the bubble tube in the liquid.

In the event of a leak, the bubble tube will be at an effective depth less than its starting depth and according less pressure is required to produce bubbling. Since the reading on the slope tube is directly proportional to the bubbling pressure, there will be a drop in the liquid level in the slope tube. The slope tube functions to greatly magnify small changes in liquid levels in the fill pipe whereby minute leaks can be detected in a relatively short period of time.

Once the time interval has elapsed, if a leak has been detected, the change in reading on the slope tube can be calibrated to a gallons per hour loss rate simply by refilling the fill pipe 14 with fluid until the original reading on the slope tube is restored. The amount of fluid necessary to restore the original reading is the amount which leaked from the tank during the test interval and simple calculations will yield the necessary rate of loss data.

Any testing device for use in this environment must account for thermal variation which causes expansion of the liquid contained in the tank. Such thermal expansion can easily account for any apparent loss. The present invention, because the test interval is relatively short, minimizes the effects of thermal interference with the measurement process. Additional safeguards include filling the tank to be tested 12 to 24 hours before the testing is to occur to permit thermal stabilization of the tank.

While I have shown and described a preferred embodiment of the invention, it will be appreciated that other embodiments are possible and accordingly the invention is to be limited solely by the claims presented herewith.

What is claimed is:

1. A portable, self-contained apparatus for detecting small leaks in a substantially full, large fluid storage tank, said tank having a relatively small diameter fill pipe at the top portion thereof, said tank comprising:
   (a) a pressure chamber containing fluid in a lower portion thereof;
   (b) a source of pressurized gas communicating with an upper portion of said chamber;
   (c) slope tube means communicating with the lower portion of said chamber below the level of the fluid therein;
   (d) means for communicating the upper portion of the pressure chamber with the fill pipe, said means comprising a bubble tube;
   whereby when gas is introduced into the upper portion of said chamber it pressurizes the chamber causing: (i) gas to bubble out of the bubble tube into said fill pipe and (ii) the fluid in the chamber to be displaced into the slope tube means, fluid so displaced being a function of the depth of the bubble tube in the liquid in said fill tube, so that leakage can be detected by observation of changes in the fluid level in said slope tube means.

2. The apparatus according to claim 1 wherein said pressure chamber is cylindrical and includes a removable end to permit access thereto.

3. The apparatus according to claim 1 wherein said slope tube means includes:
   (a) a transparent slope tube;
   (b) means for communicating the tube with the chamber;
   (c) means for positioning the tube at selected angles to the vertical to obtain maximum sensitivity and range.

4. The apparatus according to claim 3 wherein said communication means is a flexible tubular connector permitting the transparent tube to be articulated through a range of acute angles to the vertical.

5. The apparatus according to claim 3 wherein said positioning means includes support means located at the end of said slope tube remote from said communicating means for supporting said tube at selected angular positions.

6. The apparatus according to claim 1 wherein said slope tube means includes graticule means for calibrating changes in the fluid level.

7. The apparatus according to claim 3 wherein said slope tube means includes graticule means for calibrating changes in the fluid level in said tube.

8. A method of detecting small leaks in a substantially full, large volume fluid storage tank having a relatively small volume fill pipe at the top portion thereof comprising the steps of:
   (a) providing a pressure chamber containing a fluid in a lower portion thereof;
   (b) communicating a slope tube with the lower portion of said chamber below the level of the fluid therein;
   (c) communicating the storage tank fill pipe with the upper portion of said chamber via a bubble tube;
   (d) pressurizing the chamber to cause:
      (i) bubbling in the fill pipe,
      (ii) liquid to be displaced from the chamber into the slope tube as a function of the depth of the bubble tube in the fill pipe liquid;
   (e) noting the initial fluid level in the slope tube at the time step (d) is performed;
   (f) continuing step (d) for a known period of time and noting the change, if any, in the liquid level to said slope tube during said known time period,
   thereby to determine if said tank is leaking.

9. The method according to claim 8 further including the steps of:
   (g) adding fluid to said fill pipe at the end of said known time period in an amount sufficient to restore the initial liquid level in the slope tube;
   (h) calculating the leak rate of the tank from the quantity of fluid added in step (g) and the known time period.

* * * * *